June 6, 1933.  C. SCHLUMBERGER  1,913,293
ELECTRICAL PROCESS FOR THE GEOLOGICAL INVESTIGATION
OF THE POROUS STRATA TRAVERSED BY DRILL HOLES
Filed Jan. 23, 1932
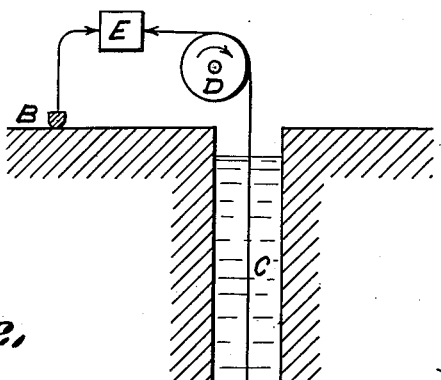
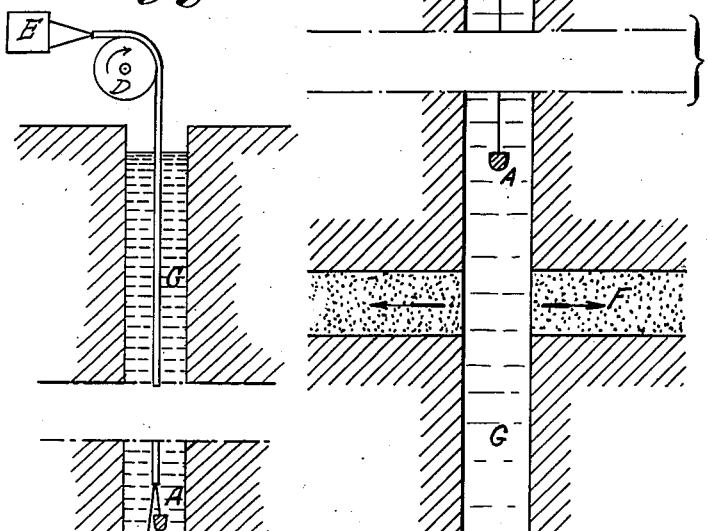
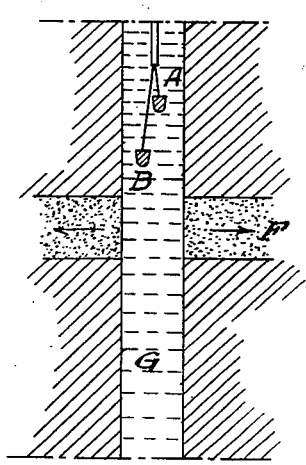
Inventor
Conrad Schlumberger
By Mauro + Lewis
Attorney Patented June 6, 1933

1,913,293

UNITED STATES PATENT OFFICE

CONRAD SCHLUMBERGER, OF PARIS, FRANCE

ELECTRICAL PROCESS FOR THE GEOLOGICAL INVESTIGATION OF THE POROUS STRATA TRAVERSED BY DRILL HOLES

Application filed January 23, 1932, Serial No. 588,445, and in France September 2, 1931.

This invention is relative to an electrical process whereby the porous strata, traversed by drill holes, may be studied by means of potential measurements effected inside the drill hole; and thereby their thickness and depth may be determined as well as the pressure existing therein.

The presence of porous strata such as sands, sandstones, or fissurated limestones is of paramount importance in the exploitation of oil-fields, since gas and oil are invariably found in such porous horizons. This factor likewise has to be considered in the case of the location of water occurrences, since water-bearing strata invariably correspond to porous strata.

Herefore the porosity of the rocks traversed by a drill hole has been studied by examining "cores" cut from the rock in the course of the drilling work and brought to the surface; but this mechanical procedure is expensive and difficult, especially in the case of loose sands and deep borings. As to the measurement of the pressure existing in the fluid contained within a porous stratum, it may be determined by allowing the source of gas, oil or water to discharge into the hole and measuring said pressure by means of a pressure gauge, if the pressure is sufficient to produce an eruption, or by observing the water-level in the bore hole if the pressure is insufficient to cause such an eruption. All of these processes, however, are attended by serious technical difficulties, especially in oil fields where pressures are considerable.

The process pursuant to this invention consists in studying the various strata with reference to their porosity and their pressure, by taking measurements of the electrical potentials existing at various depths in the uncased part of the drill hole, after filling the said drill hole with water.

The process is based upon the phenomenon known as electro-filtration, i. e., the occurrence of an electro-motive force whenever an electrolyte flows through a porous dielectric, for instance when water filters through a layer of sand.

Such an electromotive force is known to depend both on the chemical constitution of the liquid under filtration and on the dielectric constituting the filter. Its order of magnitude is proportional to the pressure which causes the filtration. In most cases the sign of this electromotive force is such that the electric current which it causes to flow possesses the same direction as the liquid in movement. This electric current gives rise by ohmic effect to differences of potential, and the measurement of these differences constitutes the basis of the process herein described.

In practice, the filtration within a porous stratum is obtained by filling the drill hole with water. The density of this water is generally increased by mixing with it clay, barytes and the like. Under these circumstances, at the depth of a given porous stratum inside the drill hole, there exists a greater head than that appertaining to the fluid enclosed therein. Therefore, it is not the fluid contained in the stratum that flows into the hole, but the water contained in the hole, that penetrates into the porous layer by filtering through the clayey coating which usually covers the walls of the borehole. Such a filtration gives rise to an electric current which may be observed by measuring the differences of potential it creates in the water contained in the drill hole, exactly at the level of the porous stratum.

Measurements of potential obtained inside a drill hole filled with mud are conveniently represented on a diagram showing in abscissæ the depth at which the measurement has been taken, and in ordinates the value of potential at the point of observation. Theory and experience show that the existence of a porous layer, in which the water penetrates by infiltration, is indicated by a local fall of potential of the water of the drill hole at the level of the said layer. This fall may reach several hundreds of millivolts. The phenomenon is indicated by a depression of the curve representing the electrical potential. The inspection of the diagram therefore makes it possible to locate the various porous layers traversed by the drill hole and to measure their depth and thickness. Whenever these layers are not homogeneous it becomes possible to study in detail the porosity of the different beds which constitute them.

In the porous strata, electromotive forces caused by osmotic or chemical phenomena may be superposed on the electromotive forces generated by electro-filtration. This will be observed in particular when the chemical composition of the water filling the hole is clearly differentiated from that of the imbibed water contained in the porous strata. This is the case in oil fields where the water in the water-bearing sandy beds often contains sodium chloride in large quantities. In such instance the speed of diffusion of the ions is not uniform and gives rise to an electromotive force between the salt ester in the porous beds and the fresh water filling the drill hole. Such an osmotic electromotive force has the same sign as that caused by the phenomenon of electrofiltration, and these two forces, therefore, join together.

Experience proves that, apart from disturbances of great magnitude which result from strata of high porosity, the diagrams resulting from the survey of the borings show quite a number of small variations of potential. These small perturbations may be ascribed either to a slight porosity of the neighboring strata involving appreciable phenomena of electro-filtration, owing to the high pressures existing in the borings or to other causes such as electro-chemical reactions between the rocks of different composition. These perturbations of potential are found to exist in the same layers in adjacent borings, so that the diagrams of potential frequently make it possible to establish excellent geological correlations between the formations encountered in two drill holes. It is also to be noted that the wet diaclases or faults will appear on the diagrams.

The process likewise allows the pressure existing in a porous layer to be measured, at least when the osmotic or chemical electromotive forces above mentioned have not a preponderant action. The measurement is based upon the fact that, all the other factors remaining constant, an electromotive force or electric-filtration is proportional to the pressure causing such filtration, i. e., in the case under consideration, to the difference between the pressure H obtaining within the drill hole at the level of the porous stratum, and the pressure $p$ obtaining within said stratum. In practice, the pressure H is lowered in a known proportion by removing a certain quantity of mud from the hole and by measuring the reduction caused thereby in the value of the potential of electro-filtration. The theoretic formula:

$$p = H\frac{s-t}{1-t}$$

is then applied, wherein $s$ is the relative reduction of pressure on the drill hole and $t$ the corresponding relative change of potential. The value of H is obtained from a knowledge of the height of the column of mud contained in the drill hole, and of the density of this mud, $s$ is determined by the measurement of the variation of the level of mud in the drill hole, and $t$ is obtained by a potentiometric measurement. Thus, all the terms of the formula are known, and the value of $p$ may be calculated. (For further details concerning this formula reference may be had to Technical Publication No. 462 of The American Institute of Mining and Metallurgical Engineers, 29 West 29th Street, New York, subject: "Electrical Coring", etc., by C. and M. Schlumberger and E. G. Leonardon, p. 28.)

The pressure inside the drill hole might be so reduced as to suppress all the electromotive forces of electro-filtration. This would occur when the pressure inside the borehole exactly balances the pressure obtaining within the stratum. Such a procedure would, however, present serious practical disadvantages, especially in oil fields rich in gas, where it becomes impossible to lower the pressure unduly without incurring serious risks of causing a blow-out.

The following apparatus may be used for measuring the electrical potentials. An electrode connected to the end of an insulated cable may be lowered to various levels inside the drill hole by means of a windlass. The upper end of this cable is connected to one of the terminals of the potentiometer. The other terminal is connected by means of an insulated wire to a second electrode grounded at a fixed point at the surface. The potential of this point is arbitrarily assumed to be equal to zero. Therefore, for each position of the movable electrode within the drill hole the potentiometer gives the value of the potential at this particular point. According to another arrangement the second terminal of the potentiometer is connected to an electrode which can be lowered to various levels in the drill hole along with the first named electrode.

The electrode used should be preferably of the "impolarizable" type, in order to eliminate the errors which are caused by the chemical electromotive forces arising from the contacts between a metal and the water of the boring or the wet soil at the surface. They are generally constituted by a metallic electrode which is surrounded by a porous vase filled with a concentrated solution of a salt of the same metal.

When considerable telluric currents are prevalent in the district (magnetic storms, neighbouring tramway lines and the like) and when the borings are deep, the two electrodes, which are located at a distance of several hundreds of meters apart, will register quite important parasitic differences of potential, which will interfere with the observation of the electro-filtration phenomena, since the latter are always of slight magnitude. In such cases it is advisable to lower both electrodes into the drill hole by means of two insulated cables. The electrodes are then placed at a small distance from each other, one meter for example. The proximity of the two electrodes makes it possible to eliminate the parasitic differences of potential, and the measurements may be effected with accuracy. It must be borne in mind, however, that the readings give then the gradient of the potential, and that a calculation is necessary to deduce therefrom the diagram of the potential itself, along the bore hole.

In practice, the diagrams are obtained directly by means of an automatic continuous device, which registers the value of the potential upon a sheet of paper which unrolls as the electrode moves (or both electrodes move) within the drill hole. The survey of a hole may then proceed very rapidly.

The attached drawing illustrates, by way of example and without limiting the invention, arrangements by which the same may be carried out in practice; Fig. 1 being a vertical section of a drill hole, illustrating diagrammatically an arrangement of apparatus wherein one of the electrodes is grounded at the surface, and Fig. 2 being a similar view showing an arrangement wherein both electrodes are adapted to be lowered into the drill hole.

In Fig. 1, A and B are the two impolarizable electrodes, and C is the insulated cable connecting the movable electrode A with a terminal of the potentiometer E, whose other terminal is connected with the grounded electrode B. D is the windlass which is used to move the electrode A plunged in the water G of the drill hole, and F is a porous stratum into which the water penetrates by filtration. The arrangement shown in Fig. 2 differs from that of Fig. 1, in that electrode B is carried at the end of a conductor forming part of a double conductor cable C, which conductor is insulated from that which carries electrode A, the two electrodes being spaced apart a suitable distance.

What I claim is:

1. An electrical process for the geological investigation of the porous strata traversed by a drill hole, consisting in filling the hole with water or mud, and measuring in this fluid at various depths in the uncased part of the hole the differences of potential which spontaneously take place at the contact between the porous strata and said fluid.

2. An electrical process for the geological investigation of the porous strata traversed by a drill hole, consisting in filling the hole with water or mud, and measuring in this fluid at various depths in the uncased part of the hole the differences of potential which spontaneously take place at the contact between the porous strata and said fluid, without sending any artificial current into the drill hole.

3. A process as claimed in claim 1, wherein the waterhead existing in the drill hole is modified by a known quantity as by lowering the water level, whereafter the variations of potential resulting from this modification of waterhead are measured at various depths in the water, so that the pressures within the various porous strata may be calculated therefrom.

In testimony whereof I have signed this specification.

CONRAD SCHLUMBERGER.